US012573562B2

(12) United States Patent
Tanaka

(10) Patent No.: US 12,573,562 B2
(45) Date of Patent: Mar. 10, 2026

(54) SOLID ELECTROLYTIC CAPACITOR ELEMENT, SOLID ELECTROLYTIC CAPACITOR, AND METHOD FOR MANUFACTURING SOLID ELECTROLYTIC CAPACITOR ELEMENT

(71) Applicant: Murata Manufacturing Co., Ltd., Nagaokakyo (JP)

(72) Inventor: Yasuo Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 97 days.

(21) Appl. No.: 18/584,308

(22) Filed: Feb. 22, 2024

(65) Prior Publication Data

US 2024/0194414 A1     Jun. 13, 2024

Related U.S. Application Data

(63) Continuation of application No. PCT/JP2022/027205, filed on Jul. 11, 2022.

(30) Foreign Application Priority Data

Aug. 26, 2021     (JP) ................................. 2021-138286

(51) Int. Cl.
   *H01G 9/15*     (2006.01)
   *H01G 9/00*     (2006.01)
   (Continued)

(52) U.S. Cl.
   CPC ........... *H01G 9/025* (2013.01); *H01G 9/0036* (2013.01); *H01G 9/042* (2013.01); *H01G 9/15* (2013.01)

(58) Field of Classification Search
   CPC ...... H01G 9/025; H01G 9/0036; H01G 9/042; H01G 9/15; H01G 9/0029; H01G 9/012; H01G 9/00; H01G 9/028; H01G 9/052
   See application file for complete search history.

(56) References Cited

U.S. PATENT DOCUMENTS

| 6,128,180 A | * | 10/2000 | Araki | ........................ | H01G 9/15 |
| | | | | | 361/524 |
| 6,430,032 B2 | * | 8/2002 | Sakai | ................... | H01G 9/0036 |
| | | | | | 29/25.03 |

(Continued)

FOREIGN PATENT DOCUMENTS

| JP | 2002025863 A | 1/2002 |
| JP | 2004186684 A | 7/2004 |

(Continued)

OTHER PUBLICATIONS

International Search Report in PCT/JP2022/027205, mailed Oct. 11, 2022, 3 pages.

*Primary Examiner* — Dion R. Ferguson
(74) *Attorney, Agent, or Firm* — ArentFox Schiff LLP

(57) ABSTRACT

A solid electrolytic capacitor element that includes: an anode including a valve acting metal substrate and having a front end face and a base end face; a dielectric layer on at least a first main face of the anode but excluding at least the base end face; a mask layer including an insulating material on the dielectric layer adjacent the base end face; and a cathode on the dielectric layer at a position closer to the front end face as compared to the mask layer, wherein the cathode includes: a solid electrolyte layer on the dielectric layer, and a conductive layer on the solid electrolyte layer, the solid electrolyte layer includes a protrusion adjacent the mask layer, and a largest thickness of the solid electrolyte layer at the protrusion is larger than a thickness of the solid electrolyte layer at a rest of the solid electrolyte layer excluding the protrusion.

18 Claims, 9 Drawing Sheets

(51) Int. Cl.
  *H01G 9/025*         (2006.01)
  *H01G 9/042*         (2006.01)

(56)                    References Cited

U.S. PATENT DOCUMENTS

| 6,867,088 | B2 * | 3/2005 | Sakai | H01G 9/15 |
| | | | | 438/210 |
| 7,388,741 | B2 * | 6/2008 | Konuma | H01G 9/15 |
| | | | | 29/25.03 |
| 9,318,268 | B2 * | 4/2016 | Onoue | H01G 9/028 |
| 11,521,801 | B2 * | 12/2022 | Hong | H01G 11/36 |
| 12,131,872 | B2 * | 10/2024 | Umahashi | H01G 9/0036 |
| 2002/0015279 | A1 * | 2/2002 | Sakai | H01G 9/15 |
| | | | | 361/523 |
| 2002/0021547 | A1 | 2/2002 | Sakai et al. | |
| 2002/0141141 | A1 | 10/2002 | Nitoh et al. | |
| 2006/0152883 | A1 | 7/2006 | Konuma et al. | |
| 2024/0120155 | A1 * | 4/2024 | Tamatani | H01G 9/012 |
| 2024/0194414 | A1 * | 6/2024 | Tanaka | H01G 9/028 |

FOREIGN PATENT DOCUMENTS

| JP | 2009123876 | A | | 6/2009 | |
| JP | 2010028139 | A | | 2/2010 | |
| JP | 4683318 | B2 | * | 5/2011 | H01G 9/0036 |
| WO | 0175917 | A1 | | 10/2001 | |

* cited by examiner

SOLID ELECTROLYTIC CAPACITOR ELEMENT, SOLID ELECTROLYTIC CAPACITOR, AND METHOD FOR MANUFACTURING SOLID ELECTROLYTIC CAPACITOR ELEMENT

CROSS REFERENCE TO RELATED APPLICATIONS

The present application is a continuation of International application No. PCT/JP2022/027205, filed Jul. 11, 2022, which claims priority to Japanese Patent Application No. 2021-138286, filed Aug. 26, 2021, the entire contents of each of which are incorporated herein by reference.

TECHNICAL FIELD

The present invention relates to a solid electrolytic capacitor element, a solid electrolytic capacitor, and a method of producing a solid electrolytic capacitor element.

BACKGROUND ART

WO01/75917 ("Patent document 1") discloses a solid electrolytic capacitor element which has a masking portion (mask layer) for insulating an anode from a cathode to prevent a solid electrolyte from creeping up, etc., and in which the thickness of a solid electrolyte layer at the periphery of a valve-acting porous metal substrate is larger than the thickness of the solid electrolyte layer at the center of the valve-acting porous metal substrate.

SUMMARY OF THE INVENTION

In a solid electrolytic capacitor element, a solid electrolyte layer is likely to be thin and have stress in a region near a mask layer. In the region, a conductive layer on the solid electrolyte layer tends to come in contact with a dielectric layer, so that a leakage current due to a tunneling current tends to occur. This may deteriorate the withstand voltage or the reflow resistance. Here, the term "reflow resistance" refers to the resistance of a finished solid electrolytic capacitor to the stress during reflow.

To overcome the issue, as described in Patent Literature 1, the leakage current can be expected to be reduced by increasing the thickness of a solid electrolyte layer at the periphery of a substrate.

However, in the solid electrolytic capacitor element in Patent Literature 1, when the thickness of the entire solid electrolyte layer at the periphery of the substrate is increased to better suppress the leakage current, the solid electrolytic capacitor element becomes thicker than necessary at the periphery of the substrate outside the region near the mask layer. Thus, the volume efficiency of a solid electrolytic capacitor assembled by stacking the solid electrolytic capacitor element is reduced.

The present invention aims to solve the above-described problems and to provide a solid electrolytic capacitor element and a method of producing a solid electrolytic capacitor element which can materialize a thin solid electrolytic capacitor with excellent withstand voltage and excellent reflow resistance. The present invention also aims to provide a thin solid electrolytic capacitor with excellent withstand voltage and excellent reflow resistance.

The solid electrolytic capacitor element of the present invention includes: an anode including a valve acting metal substrate and having a front end face and a base end face; a dielectric layer on at least a first main face of the anode but excluding at least the base end face; a mask layer including an insulating material on the dielectric layer adjacent the base end face; and a cathode on the dielectric layer at a position closer to the front end face as compared to the mask layer, wherein the cathode includes: a solid electrolyte layer on the dielectric layer, and a conductive layer on the solid electrolyte layer, wherein the solid electrolyte layer includes a protrusion adjacent the mask layer, and a largest thickness of the solid electrolyte layer at the protrusion is larger than a thickness of the solid electrolyte layer at a rest of the solid electrolyte layer excluding the protrusion.

The solid electrolytic capacitor of the present invention includes a stack of a plurality of the solid electrolytic capacitor elements of the present invention.

The method of producing a solid electrolytic capacitor element of the present invention includes: forming a dielectric layer on at least a first main face of an anode comprising a valve acting metal substrate and having a front end face and a base end face; forming a mask layer comprising an insulating material on the dielectric layer adjacent the base end face; immersing the anode with the mask layer on the dielectric layer from the front end face side in a solid electrolyte-containing treatment liquid until the treatment liquid contacts the mask layer; and pulling up the anode from the treatment liquid and drying the treatment liquid, wherein the drying is performed while the anode is inverted upside down from a state in the immersion so as to form a protrusion in the solid electrolyte layer adjacent the mask layer such that a largest thickness of the solid electrolyte layer at the protrusion is larger than a thickness of the solid electrolyte layer at a rest of the solid electrolyte layer excluding the protrusion.

The present invention can provide a solid electrolytic capacitor element and a method of producing a solid electrolytic capacitor element which can materialize a thin solid electrolytic capacitor with excellent withstand voltage and excellent reflow resistance. Additionally, the present invention can provide a thin solid electrolytic capacitor with excellent withstand voltage and excellent reflow resistance.

DETAILED DESCRIPTION OF THE PREFERRED EMBODIMENTS

Hereinafter, the solid electrolytic capacitor element, the solid electrolytic capacitor, and the method of producing a solid electrolytic capacitor element of the present invention will be described.

However, the present invention is not limited to the following embodiments, and can be appropriately modified and applied without changing the gist of the present invention. The present invention also includes a combination of two or more of individual desirable embodiments described below.

It should be understood that embodiments described below are merely examples, and embodiments described in different embodiments can be partially replaced or combined with each other. In the multiple embodiments, description of matters common among the embodiments are omitted, and only different points are described.

[Solid Electrolytic Capacitor Element]

Figure 1:
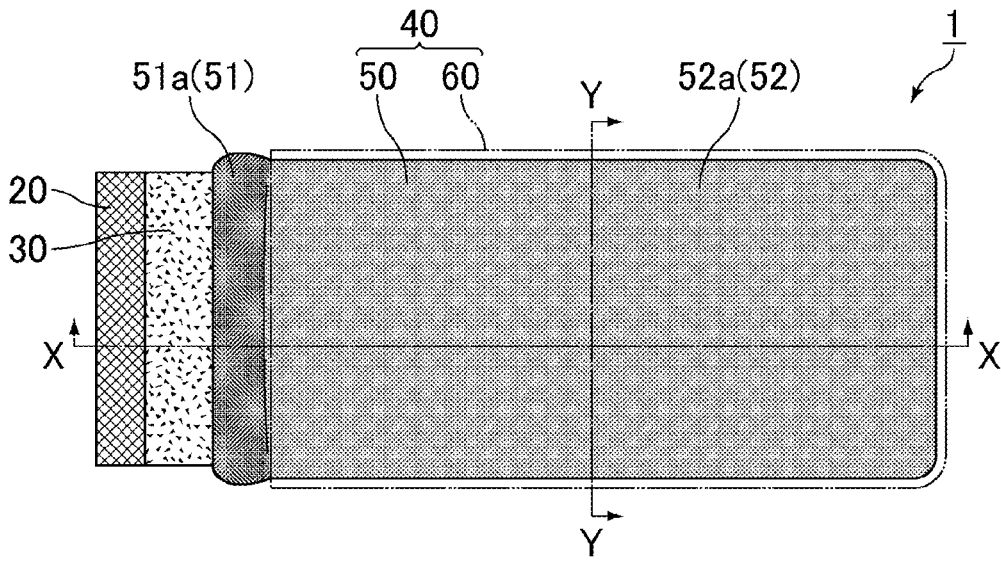
FIG. 1 is a plan view schematically showing an example of a solid electrolytic capacitor element according to an embodiment of the present invention.
Figure 2:
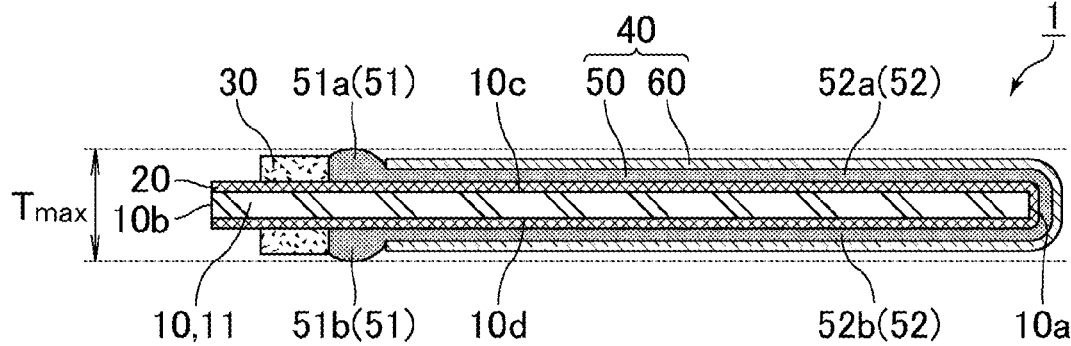
FIG. 2 is a cross-sectional view taken along line X-X of the solid electrolytic capacitor element shown in FIG. 1.
Figure 3:
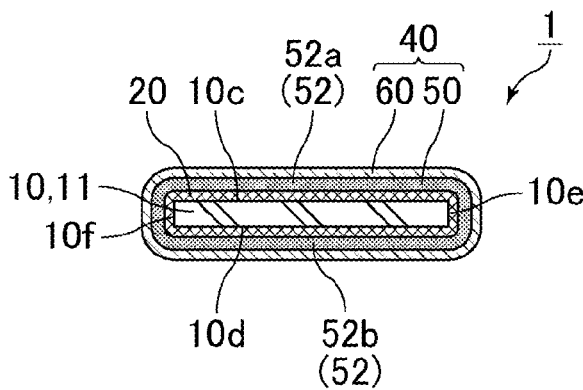
FIG. 3 is a cross-sectional view taken along line Y-Y of the solid electrolytic capacitor element shown in FIG. 1.
Figure 4:
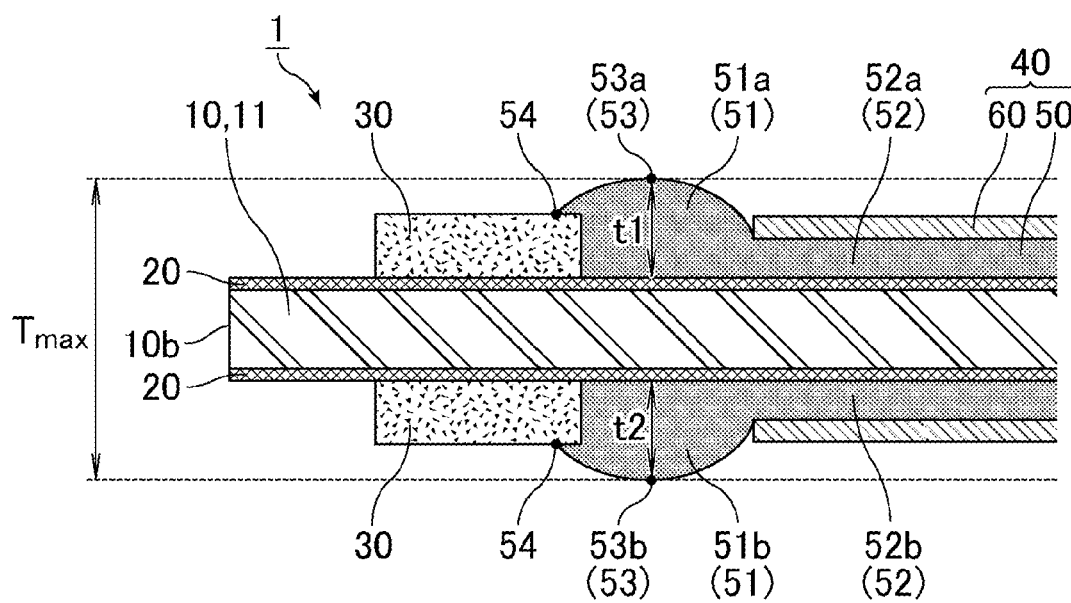
FIG. 4 is an enlarged cross-sectional view of a base end portion of the solid electrolytic capacitor element shown in FIG. 2.

FIG. 1 is a plan view schematically showing an example of a solid electrolytic capacitor element according to an embodiment of the present invention. FIG. 2 is a cross-sectional view taken along line X-X of the solid electrolytic capacitor element shown in FIG. 1. FIG. 3 is a cross-sectional view taken along line Y-Y of the solid electrolytic capacitor element shown in FIG. 1. FIG. 4 is an enlarged cross-sectional view of a base end portion of the solid electrolytic capacitor element shown in FIG. 2. In FIG. 1, a conductive layer 60 of a cathode 40 is depicted with a broken line. FIG. 1 shows the state seen through the conductive layer 60.

A solid electrolytic capacitor element 1 shown in FIG. 1, FIG. 2, FIG. 3, and FIG. 4 includes an anode 10 including a valve acting metal substrate 11 and having a front end face

10*a* and a base end face 10*b*; a dielectric layer 20 provided on a surface of the anode 10 but excluding the base end face 10*b*; a mask layer 30 including an insulating material provided on the dielectric layer 20 along the base end face 10*b*; and a cathode 40 provided on the dielectric layer 20 at a position closer to the front end face 10*a* as compared to the mask layer 30, wherein the cathode 40 includes a solid electrolyte layer 50 provided on the dielectric layer 20 and a conductive layer 60 provided on the solid electrolyte layer 50.

On one main face 10*c* side of the anode 10, the solid electrolyte layer 50 includes a protrusion 51*a* along the mask layer 30. A largest thickness t1 (see, FIG. 4) of the solid electrolyte layer 50 at the protrusion 51*a* is larger than the thickness of the solid electrolyte layer 50 at a rest of the solid electrolyte layer 52*a* excluding the protrusion 51*a*.

Likewise, on the other main face 10*d* side of the anode 10, the solid electrolyte layer 50 includes a protrusion 51*b* along the mask layer 30. A largest thickness t2 (see, FIG. 4) of the solid electrolyte layer 50 at the protrusion 51*b* is larger than the thickness of the solid electrolyte layer 50 at a rest of the solid electrolyte layer 52*b* excluding the protrusion 51*b*.

Therefore, the film thickness of the solid electrolyte layer 50 in a region near the mask layer 30 can be preferentially increased while preventing the film thickness of the solid electrolyte layer 50 from increasing more than necessary in other regions. Thus, the occurrence of a leakage current can be efficiently suppressed in the region near the mask layer 30 while reducing the total thickness of the solid electrolyte capacitor element 1, thereby improving the volume efficiency of the solid electrolytic capacitor including the solid electrolytic capacitor element 1. Consequently, the solid electrolytic capacitor obtains improved withstand voltage and reflow resistance and also can be thin.

Herein, the term "protrusion" encompasses a protruding surface portion and a base overlapping the protruding portion.

The phrase "thickness of the solid electrolyte layer at a rest of the solid electrolyte layer" refers to the largest thickness of the rest of the solid electrolyte layer.

The conductive layer 60 does not cover the solid electrolyte layer 50 in a region from a thickest portion 53*a* of the protrusion 51*a* to a base end 54, which is on the base end face side 10*b* of the anode 10, of the solid electrolyte layer 50. The conductive layer 60 does not cover the solid electrolyte layer 50 in a region from a thickest portion 53*b* of the protrusion 51*b* to the base end 54, which is on the base end face side 10*b* of the anode 10, of the solid electrolyte layer 50. In other words, the total thickness of the solid electrolytic capacitor element 1 can be more efficiently reduced because of the absence of the conductive layer 60 on the thickest portions 53*a* and 53*b* of the protrusions 51*a* and 51*b*, respectively. Further, it is possible to prevent the conductive layer 60 from climbing over the mask layer 30 and contacting the dielectric layer 20, whereby the occurrence of a leakage current can be suppressed.

Here, the thickest portions 53*a* and 53*b* are the portions where the protrusions 51*a* and 51*b*, respectively, are the thickest.

The thicknesses of the solid electrolytic capacitor element 1 at the rest of the solid electrolyte layer 52*a* and 52*b* is not larger than thicknesses Tmax of the solid electrolytic capacitor element 1 at the thickest portions 53*a* and 53*b*, respectively. Thus, similarly, the total thickness of the solid electrolytic capacitor element 1 can be more efficiently reduced.

The rest of the solid electrolyte layer 52*a* and 52*b* are both flat. In other words, the rest of the solid electrolyte layer 52*a* and 52*b* is thinner than the protrusions 51*a* and 51*b*, respectively. Therefore, the conductive layer 60 can be selectively provided on the rest of the solid electrolyte layer 52*a* and 52 which are relatively thinner than the protrusions 51*a* and 51*b*, respectively, whereby the total thickness of the solid electrolytic capacitor element 1 can be further reduced. Moreover, an extensive space for a conductive adhesive can be reliably provided on the flat rest of the solid electrolyte layer 52*a* and 52*b*.

Hereinafter, the feature of the solid electrolytic capacitor element 1 will be specifically described.

Herein, in a description of structures on the main face 10*c* side and the main face 10*d* side of the anode 10, when the structures are distinguished from each other, they are denoted with the same number with "a" or "b" to distinguish them from each other. When the structures are described without distinguishing them from each other, they are denoted with the same number while omitting "a" and "b".

The anode 10 is a thin film (foil) including the valve acting metal substrate 11 and having a tetragonal shape in a plan view, preferably a rectangular (strip) shape with a pair of long sides and a pair of short sides in a plan view. The front end face 10*a* and the base end face 10*b* are end faces respectively on a pair of the sides (preferably, a pair of the short sides) of the anode 10. The base end face 10*b* is not covered with the dielectric layer 20 and exposed. It is exposed at one end face of the solid electrolytic capacitor to be connected to an external electrode described later. The anode 10 has the front end face 10*a*, the base end face 10*b*, the main faces 10*c* and 10*d*, and the side faces 10*e* and 10*f*.

Herein, the term "plan view" means a view in the direction of the normal of the main face of the anode (valve acting metal substrate).

Figure 5:
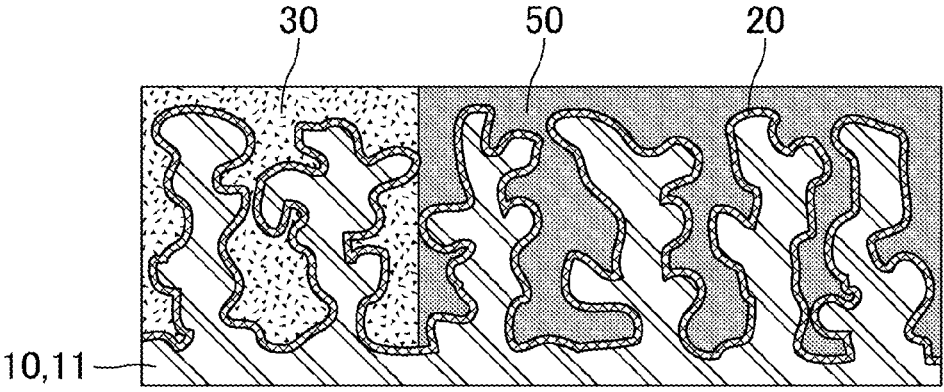
FIG. 5 is an enlarged cross-sectional view of a mask layer portion of the solid electrolytic capacitor element shown in FIG. 2.

FIG. 5 is an enlarged cross-sectional view of a mask layer portion of the solid electrolytic capacitor element shown in FIG. 2.

As shown in FIG. 5, a plurality of recesses are provided on each main face of the valve acting metal substrate 11 (anode 10). Thus, each main face of the valve acting metal substrate 11 is porous. Since the main face is porous, the valve acting metal substrate 11 has a large surface area. The present invention is not limited to a case where both main faces of the valve acting metal substrate 11 are porous, and only one of the main faces of the valve acting metal substrate 11 may be porous.

The valve acting metal substrate 11 is made of, for example, a valve acting metal such as a single metal, e.g., aluminum, tantalum, niobium, titanium, or zirconium, or an alloy containing at least one of these metals. An oxide film can be formed on the surface of the valve acting metal.

The valve acting metal substrate 11 only needs to include a core portion and a porous portion provided on at least one main face of the core portion, and one obtained by etching the surface of the metal foil, one obtained by forming a porous fine powder sintered body on the surface of the metal foil, or the like can be appropriately used.

The dielectric layer 20 is provided on the surface of the anode 10 excluding the base end face 10*b*. Specifically, the dielectric layer 20 is provided on the front end face 10*a*, main faces 10*c* and 10*d*, and side faces 10*e* and 10*f* of the anode 10 but is not provided on the base end face 10*b* of the anode 10.

It is sufficient that the dielectric layer 20 is provided on at least one of the main faces 10*c* and 10*d* of the anode 10 excluding the base end face 10*b*.

The dielectric layer 20 preferably includes an oxide film provided on the surface of the valve acting metal substrate

11. For example, the dielectric layer 20 includes an aluminum oxide. The aluminum oxide is formed by anodizing the surface of the valve acting metal substrate 11 as described later.

The mask layer 30 is a linear (extending in a belt-like shape) insulating component provided on the dielectric layer 20 adjacent the base end face 10*b* of the anode 10, preferably along a short side of the anode 10. The mask layer 30 separates the anode 10 from the cathode 40 to ensure insulation between them. The mask layer 30 divides the anode 10 into a region on the base end face 10*b* side and a region on the front end face 10*a* side. The mask layer 30 is away at a predetermined distance from the base end face 10*b* but may extend to just before the edge of the base end face 10*b*. The mask layer 30 is provided on the main faces 10*c* and 10*d* and the side faces 10*e* and 10*f* of the anode 10 via the dielectric layer 20. Like the dielectric layer 20, it is sufficient that the mask layer 30 is provided on at least one of the main faces 10*c* and 10*d* (on which the dielectric layer is present) of the anode 10.

As shown in FIG. 5, the mask layer 30 is preferably provided so as to fill a plurality of pores (recesses) of the valve acting metal substrate 11. Yet, it is sufficient that a part of the outer surface of the dielectric layer 20 is covered with the mask layer 30, and pores (recesses) of the valve acting metal substrate 11 not filled with the mask layer 30 may be present.

The mask layer 30 contains an insulating material. The mask layer 30 is formed, for example, by applying a mask material such as a composition containing an insulating resin. Examples of the insulating resin include polyphenylsulfone (PPS), polyethersulfone (PES), a cyanate ester resin, a fluororesin (tetrafluoroethylene, tetrafluoroethylene-perfluoroalkyl vinyl ether copolymers, etc.), a composition containing a soluble polyimide siloxane and an epoxy resin, a polyimide resin, a polyamideimide resin, and derivatives or precursors thereof.

The mask material can be applied by, for example, a method such as screen printing, roller transfer, dispenser application, or inkjet printing.

The cathode 40 includes the solid electrolyte layer 50 provided on the dielectric layer 20 and the conductive layer 60 provided on the solid electrolyte layer 50. The cathode 40 is provided on the dielectric layer 20 at a position closer to the front end face 10*a* as compared to the mask layer 30. Specifically, the cathode 40 is on the dielectric layer 20 in the region on the front end face 10*a* side of the anode 10 divided by the mask layer 30.

The solid electrolyte layer 50 is provided on the dielectric layer 20. As shown in FIG. 5, the solid electrolyte layer 50 is preferably provided so as to fill a plurality of pores (recesses) of the valve acting metal substrate 11. Yet, it is sufficient that a part of the outer surface of the dielectric layer 20 is covered with the solid electrolyte layer 50, and pores (recesses) of the valve acting metal substrate 11 not filled with the solid electrolyte layer 50 may be present.

The solid electrolyte layer 50 is provided on the dielectric layer 20 at a position closer to the front end face 10*a* as compared to the mask layer 30. Specifically, the solid electrolyte layer 50 is on the dielectric layer 20 in the region on the front end face 10*a* side of the anode 10 divided by the mask layer 30.

The base end 54 of the solid electrolyte layer 50 is on the outer main face (main face on the side opposite to the anode 10) of the mask layer 30. As shown in FIG. 4, the solid electrolyte layer 50 may cover a part of the outer main face of the mask layer 30 or may cover the entire outer main face of the mask layer 30. The solid electrolyte layer 50 may be arranged in line with and in contact with the mask layer 30 such that it does not cover the entire outer main face of the mask layer 30.

The solid electrolyte layer 50 has the protrusion 51*a* along the mask layer 30 and the rest of the solid electrolyte layer 52*a* excluding the protrusion 51*a* on the main face 10*c* side of the anode 10. The solid electrolyte layer 50 has the protrusion 51*b* along the mask layer 30 and the rest of the solid electrolyte layer 52*b* excluding the protrusion 52 on the other main surface 10*d* side of the anode.

The protrusion 51 is a partially thick part of the solid electrolyte layer 50. The protrusion 51 is a linear (belt-like) portion in parallel to the mask layer 30. In other words, the protrusion 51 is a linear protruding portion.

As shown in FIG. 4, the protrusion 51 has an arc shape surface in a cross-sectional view in the direction perpendicular to the mask layer 30 but may have a trapezoidal shape surface or a triangular shape surface.

In contrast, the rest of the solid electrolyte layer 52 is flat and has a substantially constant in-plane thickness. Therefore, in the solid electrolytic capacitor element 1, the thickness of the solid electrolyte layer 50 at the rest of the solid electrolyte layer 52 is the thickness of the flat portion.

As shown in FIG. 2, the solid electrolyte layer 50 is substantially linearly symmetric about the anode 10 as the axis of symmetry in a cross-sectional view in the direction perpendicular to the mask layer 30. In other words, the protrusions 51*a* and 51*b* have substantially the same shape, the rest of the solid electrolyte layer 52*a* and 52*b* have substantially the same shape, and the thickest portions 53*a* and 53*b* are located at substantially the same position on the anode 10.

On the main face 10*c* side of the anode 10, the largest thickness t1 of the solid electrolyte layer 50 at the protrusion 51*a* is larger than the thickness of the solid electrolyte layer 50 at the rest of the solid electrolyte layer 52*a*. On the main face 10*d* side of the anode 10, the largest thickness t2 of the solid electrolyte layer 50 at the protrusion 51*b* is larger than the thickness of the solid electrolyte layer 50 at the rest of the solid electrolyte layer 52*b*. In other words, the solid electrolyte layer 50 is the thickest at the protrusion 51*a* along the mask layer 30 on the main face 10*c* side of the anode 10, while it is the thickest at the protrusion 51*b* along the mask layer 30 on the main face 10*d* side of the anode 10.

Specifically, the difference between the largest thickness t1 of the solid electrolyte layer 50 at the protrusion 51*a* and the thickness of the solid electrolyte layer 50 at the rest of the solid electrolyte layer 52*a* (for example, at the center of the rest of the solid electrolyte layer 52*a*) is, for example, preferably 2 μm to 50 μm, more preferably 5 μm to 40 μm, still more preferably 10 μm to 30 μm.

The above ranges also apply to the difference between the largest thickness t2 of the solid electrolyte layer 50 at the protrusion 51*b* and the thickness of the solid electrolyte layer 50 at the rest of the solid electrolyte layer 52*b* (for example, at the center of the 52*b*).

Here, the term "thickness of solid electrolyte layer" refers to the thickness in the direction of the normal of one main face of the anode.

As a material constituting the solid electrolyte layer 50, for example, conductive polymers such as polypyrroles, polythiophenes, and polyanilines are used. Polythiophenes are preferred, and poly (3,4-ethylenedioxythiophene) called PEDOT is particularly preferred among these. The conductive polymer may contain a dopant such as polystyrene sulfonates (PSS).

The solid electrolyte layer 50 is formed by, for example, a method of forming a polymerized film of a conductive polymer such as poly (3,4-ethylenedioxythiophene) on the surface of the dielectric layer 20 using a solution containing a polymerizable monomer such as 3,4-ethylenedioxythiophene or a method of applying a dispersion of a conductive polymer such as poly (3,4-ethylenedioxythiophene) on the surface of the dielectric layer 20 and drying the dispersion.

It is preferable to form an outer layer covering the entire dielectric layer 20 after forming an inner layer filling the pores (recesses) of the valve acting metal substrate 11. The inner layer can be formed by, for example, an immersion method, sponge transfer, screen printing, dispenser application, or inkjet printing. Similarly, the outer layer can be formed by, for example, an immersion method, sponge transfer, screen printing, dispenser application, or inkjet printing.

The conductive layer 60 is provided on the solid electrolyte layer 50. The conductive layer 60 extends before the thickest portion 53 of the protrusion 51. As shown in FIG. 4, it may not cover the entire protrusion 51. The conductive layer 60 has a substantially constant thickness.

The conductive layer 60 includes a carbon layer or a negative conductor layer, for example. The conductive layer 60 may be a composite layer of a carbon layer and a negative conductor layer on the outer surface of the carbon layer or may be a mixed layer containing carbon and negative conductor layer materials.

The carbon layer is formed by a method in which a carbon paste containing carbon particles and a resin is applied to the surface of the solid electrolyte layer 50 and dried, for example.

The carbon paste can be applied by, for example, an immersion method, sponge transfer, screen printing, spray coating, dispenser application, or inkjet printing.

The negative conductor layer is formed by, for example, a method in which a conductive paste containing metal particles such as gold, silver, copper, or platinum particles and a resin is applied to the surface of the solid electrolyte layer or the carbon layer and dried. The negative conductor layer is preferably a silver layer.

The conductive paste can be applied by, for example, an immersion method, sponge transfer, screen printing, spray coating, dispenser application, or inkjet printing.

The thickness of the solid electrolytic capacitor element 1 at a position including the rest of the solid electrolyte layer 52*a* and 52*b* is smaller than the thickness Tmax of the solid electrolytic capacitor element 1 at a position including the thickest portions 53*a* and 53*b*. In other words, the thickness of the solid electrolytic capacitor element 1 at a position including the rest of the solid electrolyte layer 52*a* and 52*b* is smaller than or substantially equal to the thickness Tmax of the solid electrolytic capacitor element 1 at a position including the thickest portions 53*a* and 53*b*.

When the protrusions 51*a* and 51*b* are respectively on both of the main faces of the anode 10, the thickness Tmax of the solid electrolytic capacitor element 1 at a position including the thickest portions 53*a* and 53*b* may be the distance between two planes which are parallel to the anode 10 and pass through the respective apexes of the thickest portions 53*a* and 53*b*.

Figure 6:
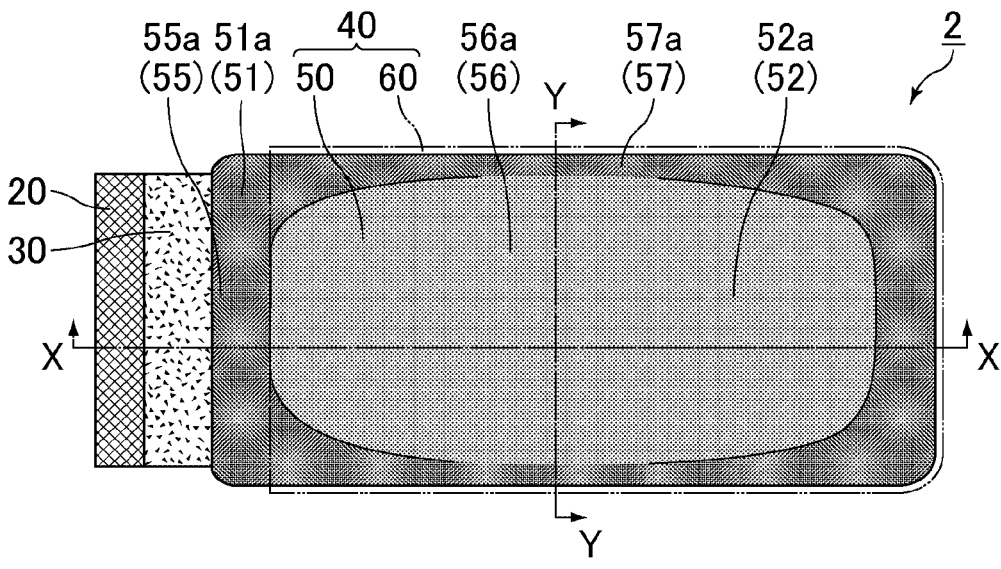
FIG. 6 is a plan view schematically showing an example of a solid electrolytic capacitor element according to another embodiment of the present invention.
Figure 7:
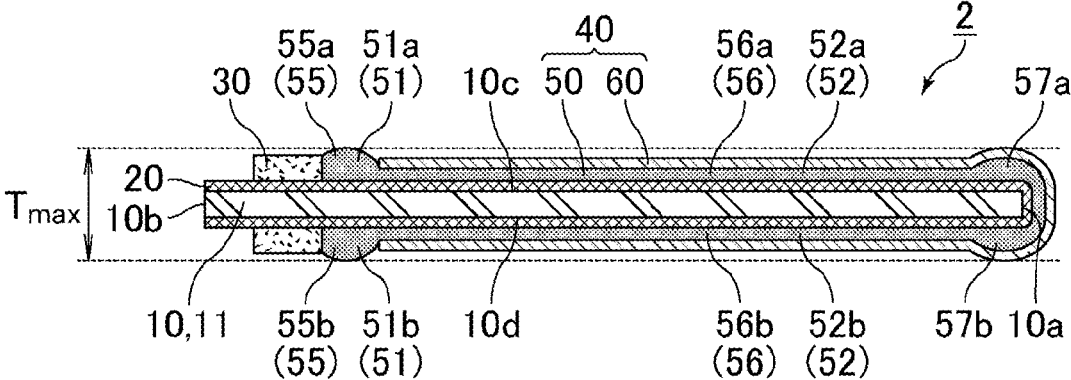
FIG. 7 is a cross-sectional view taken along line X-X of the solid electrolytic capacitor element shown in FIG. 6.
Figure 8:
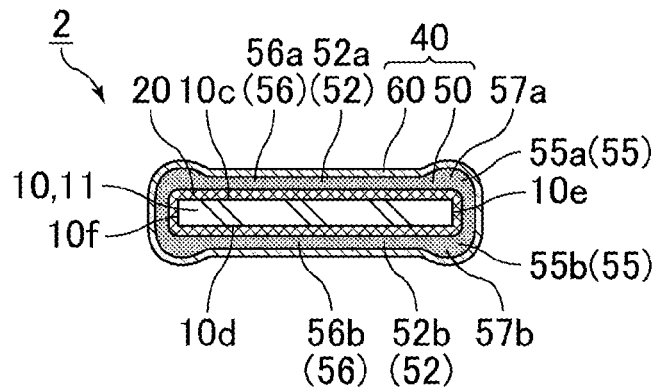
FIG. 8 is a cross-sectional view taken along line Y-Y of the solid electrolytic capacitor element shown in FIG. 6.

FIG. 6 is a plan view schematically showing an example of a solid electrolytic capacitor element according to another embodiment of the present invention. FIG. 7 is a cross-sectional view taken along line X-X of the solid electrolytic capacitor element shown in FIG. 6. FIG. 8 is a cross-sectional view taken along line Y-Y of the solid electrolytic capacitor element shown in FIG. 6. In FIG. 6, the conductive layer 60 of the cathode 40 is depicted with a broken line. FIG. 6 shows the state seen through the conductive layer 60.

In a solid electrolyte capacitor element 2 shown in FIG. 6, FIG. 7, and FIG. 8, the solid electrolyte layer 50 includes a peripheral portion 55a including the protrusion 51a and a central portion 56a surrounded by the peripheral portion 55a on one main surface 10c side of the anode 10. The peripheral portion 55a of the solid electrolyte layer is thicker than the central portion 56a of the solid electrolyte layer 50.

Likewise, on the other face 10d side of the anode 10, the solid electrolyte layer 50 includes a peripheral portion 55b including the protrusion 51b and a central portion 56b surrounded by the peripheral portion 55. The peripheral portion 55b of the solid electrolyte layer 50 is thicker than the central portion 56b of the solid electrolyte layer 50.

Thus, the solid electrolyte layer 50 can be thicker at the end portions of the anode 10 where the solid electrolyte layer 50 is likely to be thin and is susceptible to stress, whereby a leakage current can be reduced at the end portions of the anode 10. Moreover, the conductive adhesive can be prevented from protruding from the cathode 40.

The peripheral portions 55a and 55b respectively include the protrusions 51a and 51b along the mask layer 30 and U-shaped portions 57a and 57b which are portions with a substantially U shape along the front end face 10a and the side faces 10e and 10f of the anode 10. The thicknesses of the protrusions 51a and 51b are larger than the thicknesses of the U-shaped portions 57a and 57b, respectively.

The U-shaped portions 57a and 57b have similar cross-sectional shapes as those of the protrusions 51a and 51b, respectively. They have an arc shape surface in a cross-sectional view in the direction perpendicular to the extending direction but may have a trapezoidal shape surface or a triangular shape surface.

As described above, the rest of the solid electrolyte layer 52a and 52b respectively have the U-shaped portions 57a and 57b. Thus, in the solid electrolytic capacitor element 2, the thicknesses of the solid electrolyte layer 50 at the rest of the solid electrolyte layer 52a and 52b correspond to the largest thicknesses of the U-shaped portions 57a and 57b, respectively.

Figure 9:
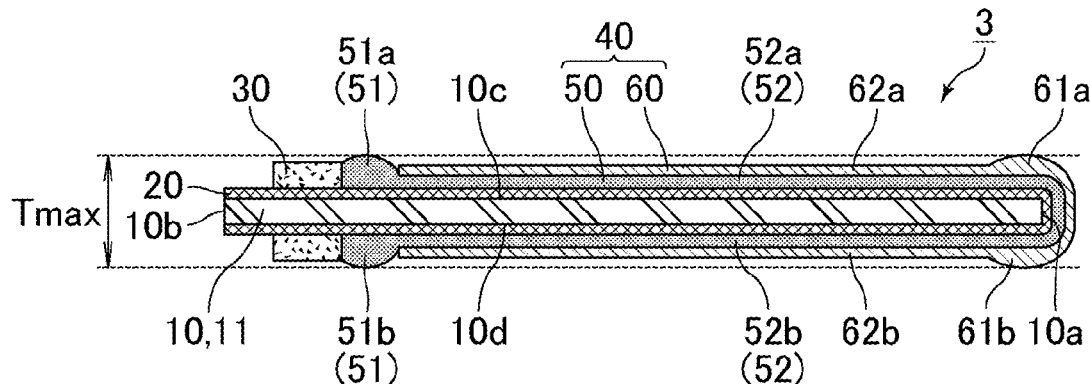
FIG. 9 is a cross-sectional view schematically showing an example of a solid electrolytic capacitor element according to still another embodiment of the present invention.

FIG. 9 is a cross-sectional view schematically showing an example of a solid electrolytic capacitor element according to still another embodiment of the present invention.

In a solid electrolytic capacitor element 3 shown in FIG. 9, as in the solid electrolytic capacitor element 1, the solid electrolyte layer 50 includes the protrusion 51a and the rest of the solid electrolyte layer 52, which is flat, on one main face 10c side of the anode 10 and the protrusion 51b and the rest of the solid electrolyte layer 52b, which is flat, on the other main face 10d side of the anode 10. Thus, in the solid electrolytic capacitor element 3, the thicknesses of the solid electrolyte layer 50 at the rest of the solid electrolyte layer 52a and 52b correspond to the thicknesses of the flat portions.

Meanwhile, in the solid electrolytic capacitor element 3, the conductive layer 60 includes a protrusion 61a adjacent the front end face 10a of the anode 10 and a rest of the conductive layer 62a excluding the protrusion 61a on one main face 10c side of the anode 10 and a protrusion 61b adjacent the front end face 10a of the anode 10 and a rest of the conductive layer 62b excluding the protrusion 61b on the other main face 10d side of the anode 10.

The protrusions 61a and 61b are partially thick parts of the conductive layer 60. The protrusions 61a and 61b are linear (belt-like) portions in parallel to the front end face 10a of the anode 10. In other words, the protrusions 61a and 61b are linear protruding portions.

Here, as shown in FIG. 9, the protrusions 61a and 61b have an arc shape surface in a cross-sectional view in the direction perpendicular to the front end face 10a of the anode 10 but may have a trapezoidal shape surface or a triangular shape surface.

In the solid electrolytic capacitor element 3, the entire cathode 40 including the solid electrolyte layer 50 and the conductive layer 60 includes a first protrusion (protruding portion) along the mask layer 30, a second protrusion (protruding portion) along the front end face 10a of the anode 10, and a flat portion excluding the first or second protrusion on each of the main face 10c side or the main face 10d side of the anode 10. The thickness of the first portion or the second protrusion is larger than the thickness of the flat portion.

[Method of Producing Solid Electrolytic Capacitor Element]

The solid electrolytic capacitor elements 1 to 3 can be produced by the method described below.

Figure 10:
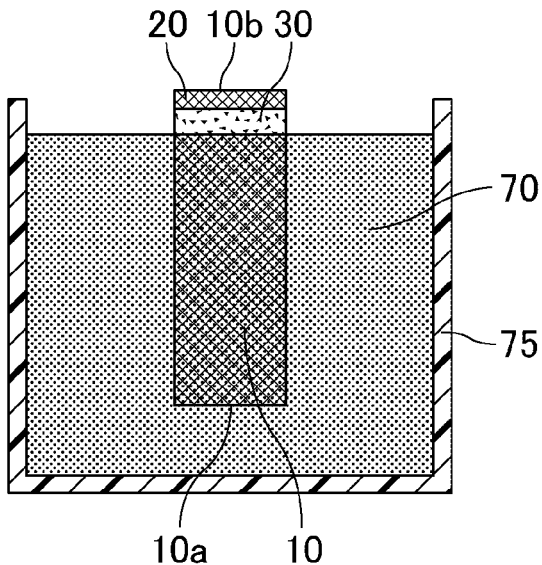
FIG. 10 is a schematic diagram showing an example of a step of immersing an anode with a mask layer in a solid electrolyte-containing treatment liquid.
Figure 11:
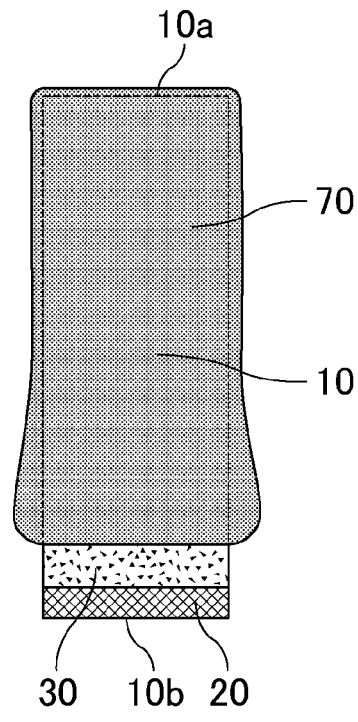
FIG. 11 is a schematic diagram showing an example of a step of pulling up the anode from the treatment liquid and drying the treatment liquid.
Figure 12:
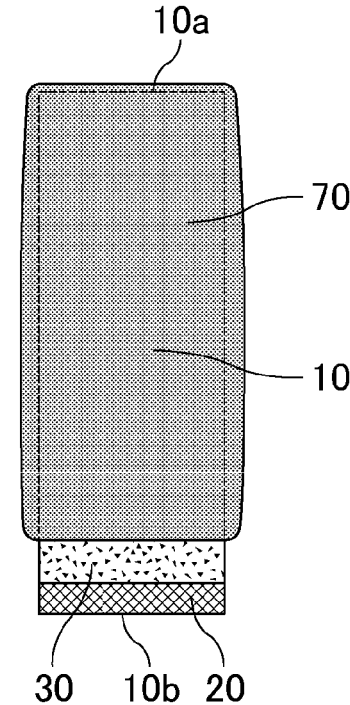
FIG. 12 is a schematic diagram showing another example of a step of pulling up the anode from the treatment liquid and drying the treatment liquid.
Figure 13:
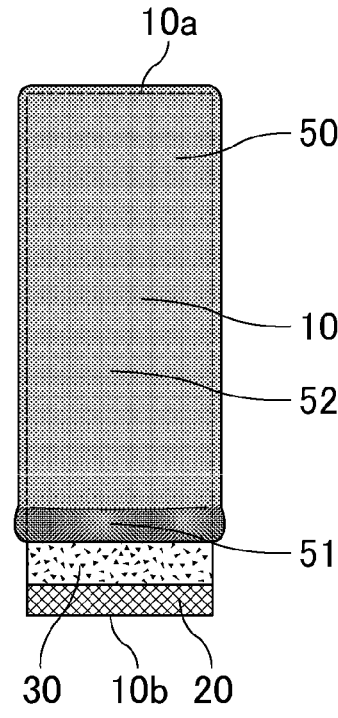
FIG. 13 is a plan view schematically showing an example of a solid electrolytic capacitor element after forming a solid electrolyte layer through the drying step shown in FIG. 11.
Figure 14:
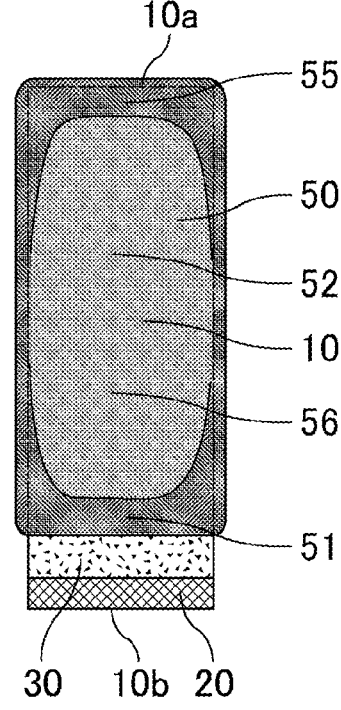
FIG. 14 is a plan view schematically showing an example of a solid electrolytic capacitor element after forming a solid electrolyte layer through the drying step shown in FIG. 12.

FIG. 10 is a schematic diagram showing an example of a step of immersing an anode with a mask layer in a solid electrolyte-containing treatment liquid. FIG. 11 is a schematic diagram showing an example of a step of pulling up the anode from the treatment liquid and drying the treatment liquid. FIG. 12 is a schematic diagram showing another example of a step of pulling up the anode from the treatment liquid and drying the treatment liquid. FIG. 13 is a plan view schematically showing an example of a solid electrolytic capacitor element after forming a solid electrolyte layer through the drying step shown in FIG. 11. FIG. 14 is a plan view schematically showing an example of a solid electrolytic capacitor element after forming a solid electrolyte layer through the drying step shown in FIG. 12.

As shown in FIG. 10, first, the anode 10 with the mask layer 30 on the dielectric layer 20 is immersed from the front end face 10a side in a solid electrolyte-containing treatment liquid 70 until the liquid contacts the mask layer 30 (first step). The treatment liquid 70 is supplied to a treatment tank 75.

Subsequently, the anode 10 is pulled up from the treatment liquid 70, and the treatment liquid 70 is dried (second step).

In the second step, the drying is performed while the anode 10 is inverted upside down from the state in the immersion as shown in FIG. 11 or FIG. 12. Specifically, the drying is performed while the front end face 10a of the anode 10 faces upward and the base end face 10b of the anode 10 faces downward.

As a result, as shown in FIG. 13 or FIG. 14, the solid electrolyte layer 50 having the protrusion 51 along the mask layer 30 can be formed. The largest thickness of the solid electrolyte layer 50 at the protrusion 51 can be larger than the thickness of the solid electrolyte layer 50 at the rest of the solid electrolyte layer 52.

Specifically, the solid electrolyte layer 50 is formed such that it becomes thick due to the gravity selectively in a region adjacent to the mask layer 30 as shown in FIG. 13. Alternatively, the solid electrolyte layer 50 is formed such that it becomes thick only at the peripheral portion 55 due to the coffee ring effect as shown in FIG. 14.

Which form the solid electrolyte layer 50 will depend on the viscosity or surface tension, contact angle, or other characteristics of the treatment liquid 70. In the embodiment shown in FIG. 11, the flat rest of the solid electrolyte layer 52 can be formed as shown in FIG. 13. In the embodiment shown in FIG. 12, the peripheral portion 55 of the solid electrolyte layer 50 has a larger thickness than the central portion 56 of the solid electrolyte layer 50 as shown in FIG. 14.

The first step and the second step may be alternately performed in this order multiple times. In this case, the drying is preferably performed while the anode 10 is inverted upside down from the state in the immersion in at least one of the multiple times of the second step or more preferably performed while the anode 10 is inverted upside down from the state in the immersion in all the multiple times of the second step.

This embodiment is suitable for separately forming the inner layer and the outer layer of the solid electrolyte layer 50.

The same treatment liquid or different treatment liquids for the immersion of the anode 10 may be used in the multiple times of the first step.

After the second step, the anode 10 with the dried treatment liquid 70 is immersed from the front end face in a conductive paste until the paste contacts the protrusion 51 (in a region not reaching the thickest portion 53) (step 3).

Subsequently, the anode 10 is pulled up from the conductive paste, and the conductive paste is dried (fourth step).

As a result, a solid electrolyte layer 60 with a substantially constant thickness as shown in FIG. 2 and FIG. 7 or a conductive layer 60 having a protrusion along the front end face 10*a* of the anode 10 as shown in FIG. 9 is formed.

The method of producing a solid electrolytic capacitor element 1 will be specifically described below. In the following example, a method of simultaneously producing a plurality of solid electrolytic capacitor elements using a large-sized valve acting metal substrate will be described.

Figure 15:
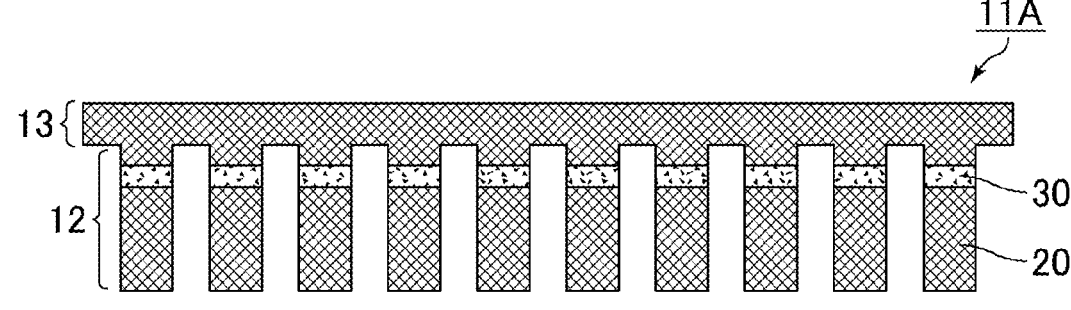
FIG. 15 is a schematic view showing an example of a step of preparing a valve acting metal substrate including the mask layer.

FIG. 15 is a schematic view showing an example of a step of preparing the valve acting metal substrate including the mask layer.

As shown in FIG. 15, a valve acting metal substrate 11A having the dielectric layers 20 on its surface is prepared. The valve acting metal substrate 11A includes a plurality of element portions 12 and a support portion 13. Each of the element portions 12 has a strip shape and protrudes from the support portion 13. In addition, the mask layer 30 is formed on the dielectric layer 20 of each of the element portions 12.

First, the valve acting metal substrate 11A having a porous portion on its surface is cut by laser processing, punching, or another processing to be processed into a shape including the plurality of element portions 12 and the support portion 13.

Next, the mask layers 30 are formed on both of the main faces and both of the side faces of element portions 12 along the short side of each of the element portions 12.

Thereafter, the valve acting metal substrate 11A is anodized to form oxide films to be the dielectric layers 20 on the surface of the valve acting metal substrate 11A. At this time, an oxide film is also formed on the side face of each element portion 12 cut by laser processing, punching, or another processing. Here, chemical conversion foil on which an oxide of the valve acting metal is already formed may be used as the valve acting metal substrate 11A. Also in this case, the valve acting metal substrate 11A after cutting is anodized to form an oxide film on the side face of the cut element portion 12.

Figure 16:
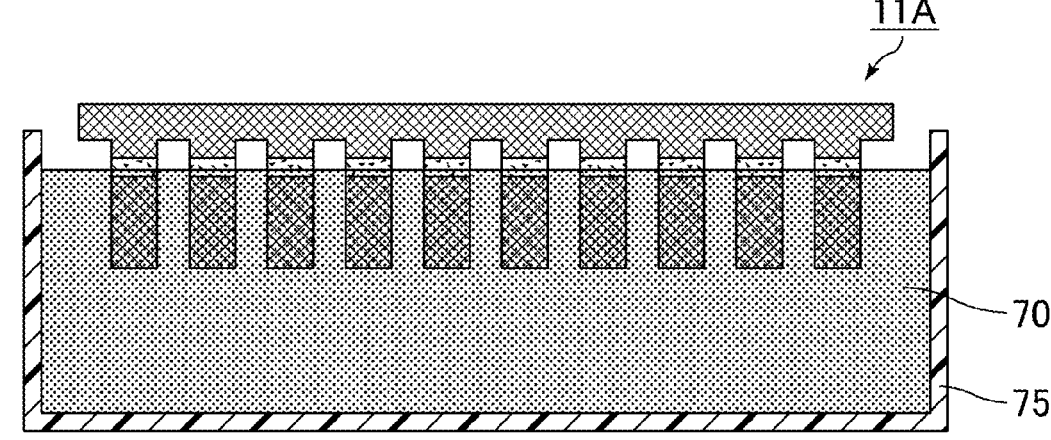
FIG. 16 is a schematic view showing an example of a step of forming the solid electrolyte layer.

FIG. 16 is a schematic view showing an example of a step of forming the solid electrolyte layer.

The solid electrolyte layer 50 (see FIG. 5, etc.) is formed on the dielectric layer 20 of the element portion 12. As shown in FIG. 16, it is preferable to apply a solid electrolyte-containing treatment liquid to the valve acting metal substrate 11A by an immersion method. FIG. 16 shows a state of supplying a solid electrolyte-containing treatment liquid 70 to a treatment tank 75.

As the solid electrolyte-containing treatment liquid 70, for example, a dispersion of a conductive polymer is used. A conductive polymer film can be formed by attaching the dispersion of the conductive polymer to the outer surface of the dielectric layer 20 and drying the dispersion. Alternatively, as the solid electrolyte-containing treatment liquid 70, a solution containing a polymerizable monomer, for example, 3,4-ethylenedioxythiophene and an oxidizing agent may be used. A conductive polymer film can be formed by chemical polymerization after attaching the solution containing a polymerizable monomer to the outer surface of the dielectric layer 20. This conductive polymer film becomes the solid electrolyte layer 50.

As shown in FIG. 16, the porous portion of the valve acting metal substrate 11A is impregnated with the treatment liquid 70 by immersing the valve acting metal substrate 11A in the treatment liquid 70. After immersion for a predetermined time, the valve acting metal substrate 11A is pulled up from the treatment liquid 70 and dried at a predetermined temperature for a predetermined time. The solid electrolyte layer 50 is formed by repeating immersion in the treatment liquid 70, pulling up, and drying a predetermined number of times. Here, in at least one time of drying, preferably in every time of drying, the treatment liquid 70 is dried while the valve acting metal substrate 11A is inverted upside down from the state in the immersion, specifically, the element portions 12 face upward and the support portion 13 faces downward.

For example, the valve acting metal substrate 11A is immersed in a first conductive polymer-containing dispersion and pulled up from the dispersion, and the dispersion is dried while the valve acting metal substrate 11A is inverted upside down from the state in the immersion, whereby a first solid electrolyte layer is formed. The immersion in the first dispersion, pulling up, and drying may be performed multiple times.

After the first solid electrolyte layer is formed, a primer layer may be formed by immersing, pulling up, and drying the valve acting metal substrate 11A in a solution containing a primer compound.

Subsequently, the valve acting metal substrate 11A is immersed in a second conductive polymer-containing dispersion and pulled up from the dispersion, and the dispersion is dried while the valve acting metal substrate 11A is inverted upside down from the state in the immersion, whereby a second solid electrolyte layer is formed.

The solid electrolyte layer formed by the above method includes the first solid electrolyte layer on the dielectric layer and the second solid electrolyte layer on the first solid electrolyte layer.

The valve acting metal substrate 11A is washed with pure water to remove an excessive primer compound. After washing, a drying treatment is performed. Accordingly, the solid electrolyte layer 50 is formed in a predetermined region.

After the solid electrolyte layer 50 is formed, the valve acting metal substrate 11A is immersed in a carbon paste, pulled up, and dried to form a carbon layer in a predetermined region.

After the carbon layer is formed, the valve acting metal substrate 11A is immersed in a conductive paste containing metal particles, such as a silver paste, pulled up, and dried to form a negative conductor layer in a predetermined region.

The element portion 12 is separated by cutting the valve acting metal substrate 11A, and a strip of the anode 10 having a cross-section corresponding to the base end face 10b is formed.

The solid electrolytic capacitor elements 1 to 3 can be obtained through the above-described steps.

[Solid Electrolytic Capacitor]

Hereinafter, an example of a solid electrolytic capacitor including the solid electrolytic capacitor element of the present invention will be described. The solid electrolytic capacitor element of the present invention may be included in a solid electrolytic capacitor having another structure. For example, a lead frame may be used as an external electrode. The solid electrolytic capacitor of the present invention may include a solid electrolytic capacitor element other than the solid electrolytic capacitor element of the present invention.

Figure 17:
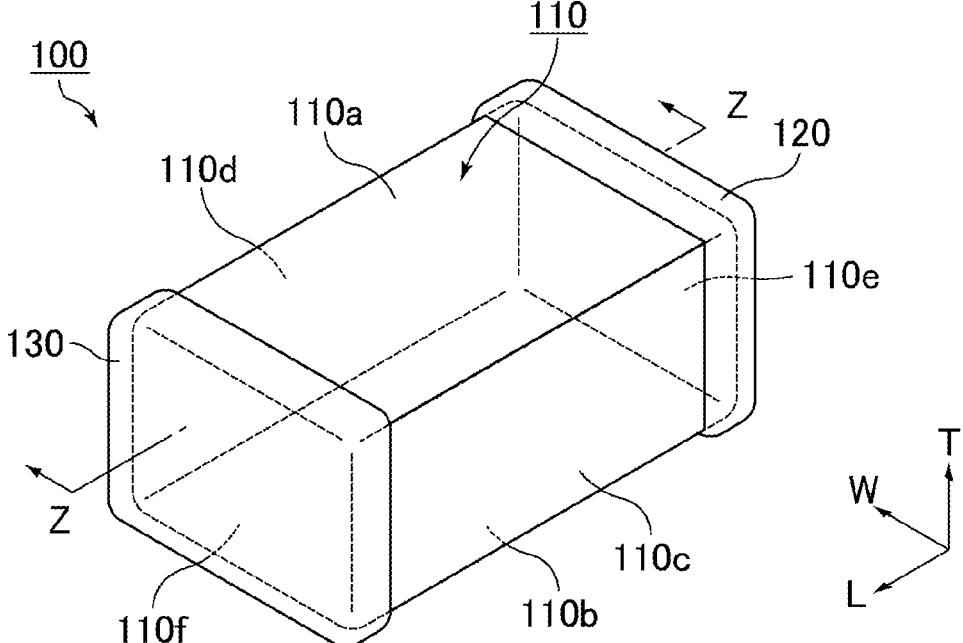
FIG. 17 is a perspective view schematically showing an example of a solid electrolytic capacitor according to an embodiment of the present invention.
Figure 18:
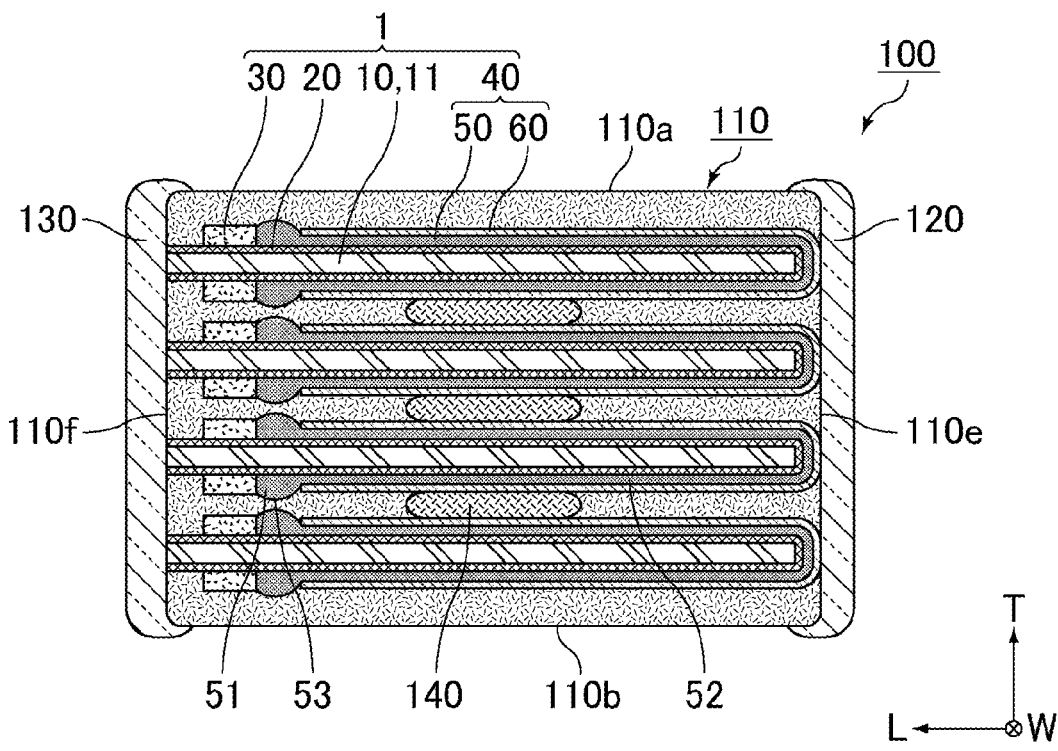
FIG. 18 is a cross-sectional view taken along line Z-Z of the solid electrolytic capacitor shown in FIG. 17.

FIG. 17 is a perspective view schematically showing an example of a solid electrolytic capacitor according to an embodiment of the present invention. FIG. 18 is a cross-sectional view taken along line Z-Z of the solid electrolytic capacitor shown in FIG. 17.

In FIGS. 17 and 18, the length direction, the width direction, and the height direction of a solid electrolytic capacitor 100 and an exterior body 110 are indicated by L, W, and T, respectively. Here, the length direction L, the width direction W, and the height direction T are orthogonal to each other.

As shown in FIGS. 17 and 18, the solid electrolytic capacitor 100 has a substantially rectangular parallelepiped outer shape. The solid electrolytic capacitor 100 includes the exterior body 110, a first external electrode 120, a second external electrode 130, and a plurality of solid electrolytic capacitor elements 1.

The exterior body 110 seals the plurality of solid electrolytic capacitor elements 1. In other words, the plurality of solid electrolytic capacitor elements 1 are embedded in the exterior body 110. The exterior body 110 may seal one solid electrolytic capacitor element 1. In other words, one solid electrolytic capacitor element 1 may be embedded in the exterior body 110.

The exterior body 110 has a substantially rectangular parallelepiped outer shape. The exterior body 110 has a first main face 110a and a second main face 110b facing each other in the height direction T, a first side face 110c and a second side face 110d facing each other in the width direction W, and a first end face 110e and a second end face 110f facing each other in the length direction L.

As described above, although the exterior body 110 has a substantially rectangular parallelepiped outer shape, preferably, corner portions and ridge portions are rounded. A corner portion is a portion where three surfaces of the exterior body 110 intersect each other. A ridge portion is a portion where two surfaces of the exterior body 110 intersect each other.

The exterior body 110 is made of, for example, a sealing resin.

The sealing resin contains at least a resin, and preferably contains a resin and a filler.

As the resin, an epoxy resin, a phenol resin, a polyimide resin, a silicone resin, a polyamide resin, a liquid crystal polymer or the like is preferably used.

As the filler, silica particles, alumina particles, or the like is preferably used.

As the sealing resin, a material containing a solid epoxy resin, a phenol resin, and silica particles is preferably used.

When a solid sealing resin is used, a resin mold such as a compression mold or a transfer mold is preferably used, and a compression mold is more preferably used. When a liquid sealing resin is used, a molding method such as a dispensing method or a printing method is preferably used. In particular, it is preferable to seal the periphery of the solid electrolytic capacitor element 1 with a sealing resin by compression molding to form the exterior body 110.

The exterior body 110 may include a substrate and a sealing resin provided on the substrate. The substrate is, for example, an insulating resin substrate such as a glass epoxy substrate. In this case, a bottom surface of the substrate defines the second main face 110b of the exterior body 110. The thickness of the substrate is, for example, 100 μm.

The plurality of solid electrolytic capacitor elements 1 are stacked via a conductive adhesive 140 in the height direction T. An extending direction of each of the plurality of solid electrolytic capacitor elements 1 is substantially parallel to the first main face 110a and the second main face 110b of the exterior body 110. The solid electrolytic capacitor elements 1 are bonded to each other with the conductive adhesive 140 interposed therebetween.

The conductive adhesive 140 is provided in a region between the rest of the solid electrolyte layer 52 of the respective solid electrolyte layers 50 in the solid electrolytic capacitor elements 1 next to each other. In order to reduce the thickness of the exterior body 110 (thickness of the solid electrolytic capacitor 100), preferably, the conductive adhesive 140 does not cover the thickest portions 53 of the solid electrolyte layers 50 in the solid electrolytic capacitor elements 1 next to each other. More preferably, the conductive adhesive 140 is not provided in the entire regions between the protrusions 51 of the solid electrolyte layers 50 in the solid electrolytic capacitor elements 1 next to each other.

The conductive adhesive 140 contains metal particles such as gold, silver, copper, or platinum particles and a resin. Here, the metal particles used are silver particles, and the resin used is an acrylic resin.

Other examples of the resin contained in the conductive adhesive 140 include urethane resins, epoxy resins, polyimide resins, and phenol resins.

The first external electrode 120 is provided on the first end face 110e of the exterior body 110. In FIG. 17, the first external electrode 120 is provided from the first end face 110e to the first main face 110a, the second main face 110b, the first side face 110c, and the second side face 110d of the exterior body 110. The first external electrode 120 is electrically connected to the conductive layer 60 of the cathode 40 in the solid electrolytic capacitor element 1, where the conductive layer 60 is exposed from the exterior body 110 on the first end face 110e. The first external electrode 120 may be directly or indirectly connected to the conductive layer 60 in the first end face 110e of the exterior body 110.

The second external electrode 130 is provided on the second end face 110f of the exterior body 110. In FIG. 17, the second external electrode 130 is provided from the second end face 110f to the first main face 110a, the second main face 110b, the first side face 110c, and the second side face 110d of the exterior body 110. The second external electrode 130 is electrically connected to the anode 10 (valve acting metal substrate 11) in the solid electrolytic capacitor element 1, where the anode 10 (valve acting metal substrate 11) is exposed from the exterior body 110 on the second end face 110f. The second external electrode 130 may be directly or indirectly connected to the anode 10 (valve acting metal substrate 11) in the second end face 110f of the exterior body 110.

Each of the first external electrode 120 and the second external electrode 130 is preferably formed by at least one method selected from the group consisting of a dip coating method, a screen printing method, a transfer method, an inkjet printing method, a dispensing method, a spray coating method, a brush coating method, a drop casting method, an electrostatic coating method, a plating method, and a sputtering method.

The first external electrode 120 preferably has a resin electrode layer containing a conductive component and a resin component. When the first external electrode 120 contains a resin component, adhesion between the first external electrode 120 and the sealing resin of the exterior body 110 is enhanced, so that reliability is improved.

The second external electrode 130 preferably has a resin electrode layer containing a conductive component and a resin component. When the second external electrode 130 contains a resin component, adhesion between the second external electrode 130 and the sealing resin of the exterior body 110 is enhanced, so that the reliability is improved.

The conductive component preferably contains, as a main component, a simple metal such as silver, copper, nickel, or tin, an alloy containing at least one of these metals, or the like.

The resin component preferably contains an epoxy resin, a phenol resin, or the like as a main component.

The resin electrode layer is formed by, for example, a method such as a dip coating method, a screen printing method, a transfer method, an inkjet printing method, a dispensing method, a spray coating method, a brush coating method, a drop casting method, or an electrostatic coating method. In particular, the resin electrode layer is preferably a printed resin electrode layer formed by applying a conductive paste by a screen printing method. When the resin electrode layer is formed by applying a conductive paste by a screen printing method, the first external electrode 120 and the second external electrode 130 tend to be flat as compared to the case where the resin electrode layer is formed by applying the conductive paste by a dip coating method. In other words, the thicknesses of the first external electrode 120 and the second external electrode 130 tend to be uniform.

When the first external electrode 120 has a resin electrode layer, the first external electrode 120 and the second external electrode 130 contain a resin component, thereby improving the adhesion between the first external electrode 120 and the negative conductor layer. Thus, reliability improves.

At least one of the first external electrode 120 and the second external electrode 130 may have what is called a plating layer formed by a plating method. Examples of the plating layer include a zinc-silver-nickel layer, a silver-nickel layer, a nickel layer, a zinc-nickel-gold layer, a nickel-gold layer, a zinc-nickel-copper layer, and a nickel-copper layer. For example, on one of these plating layers, a copper plating layer, a nickel plating layer, and a tin plating layer are preferably provided in this order (alternatively, except for at least one plating layer).

At least one of the first external electrode 120 and the second external electrode 130 may have both a resin electrode layer and a plating layer. For example, the second external electrode 130 may have a resin electrode layer connected to the anode 10 (valve acting metal substrate 11) and an outer layer plating layer provided on the surface of the resin electrode layer. The second external electrode 130 may include an inner layer plating layer connected to the anode 10 (valve acting metal substrate 11), a resin electrode layer provided so as to cover the inner layer plating layer, and an outer layer plating layer provided on the surface of the resin electrode layer.

Figure 19:
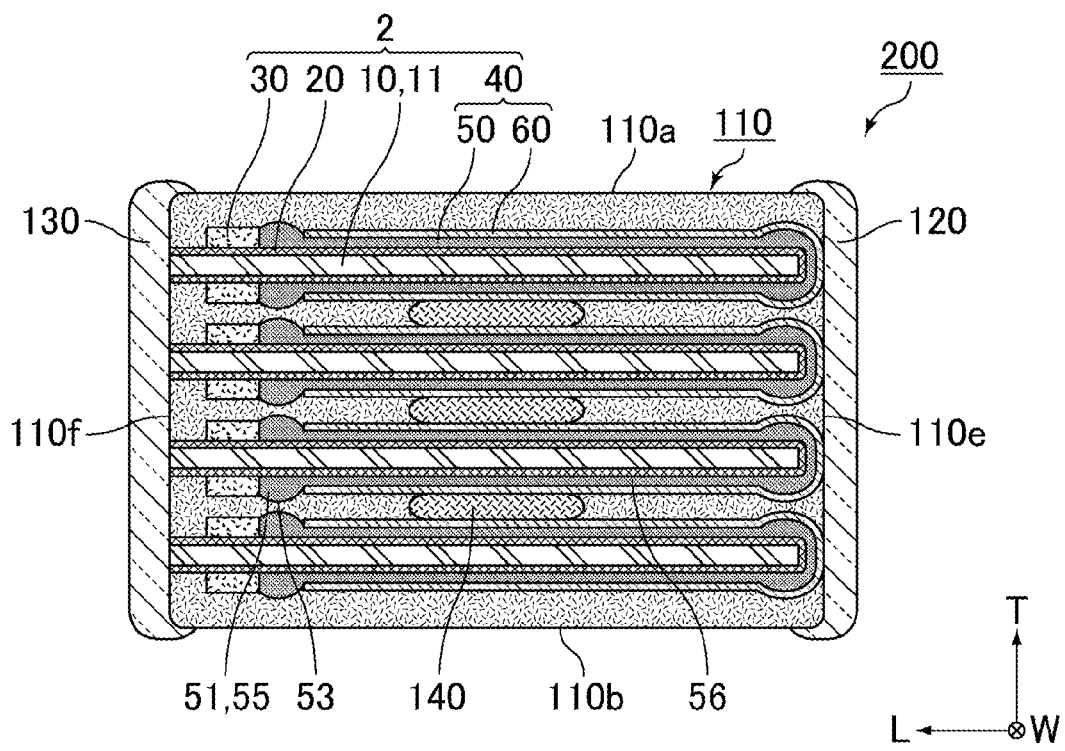
FIG. 19 is a cross-sectional view schematically showing an example of a solid electrolytic capacitor element according to another embodiment of the present invention.

FIG. 19 is a cross-sectional view schematically showing an example of a solid electrolytic capacitor element according to another embodiment of the present invention.

In a solid electrolytic capacitor 200 shown in FIG. 19, a plurality of solid electrolytic capacitor elements 2, instead of a plurality of the solid electrolytic capacitor elements 1, are stacked via the conductive adhesive 140 in the height direction T.

Figure 20:
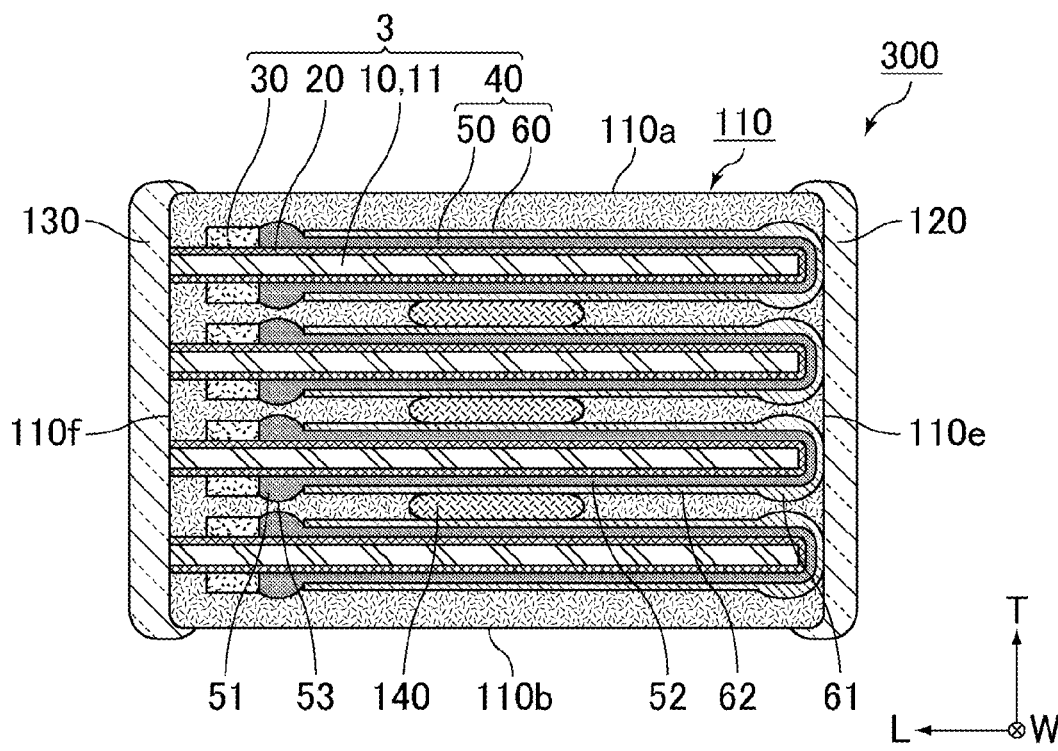
FIG. 20 is a cross-sectional view schematically showing an example of a solid electrolytic capacitor element according to still another embodiment of the present invention.

FIG. 20 is a cross-sectional view schematically showing an example of a solid electrolytic capacitor element according to still another embodiment of the present invention.

In a solid electrolytic capacitor 300 shown in FIG. 20, a plurality of solid electrolytic capacitor elements 3, instead of a plurality of the solid electrolytic capacitor elements 1, are stacked via the conductive adhesive 140 in the height direction T.

EXAMPLES

Hereinafter, examples more specifically disclosing the solid electrolytic capacitor element, the solid electrolytic capacitor, and the method of producing a solid electrolytic capacitor element of the present invention will be described. The present invention is not limited only to these examples.

Example 1-1

Aluminum foil with an etched layer on its surface was prepared as an anode (valve-acting metal substrate). The aluminum foil was anodized by immersing it in an aqueous ammonium adipate solution to form a dielectric layer on its surface.

Subsequently, a composition of a soluble polyimide siloxane and an epoxy resin was transferred by a roller to the anode with the dielectric layer to form a mask layer on both of the main faces and both of the side faces of the anode via the dielectric layer.

The obtained element was immersed in an aqueous dispersion of PEDOT: PSS to just below the mask layer and pulled up. Thereafter, drying was performed while the element was inverted upside down from the state in the immersion to form a solid electrolyte layer on the dielectric layer. As shown in FIG. 2, the solid electrolyte layer had protrusions respectively on both of the main faces of the anode along the mask layer, and the rest of the solid electrolyte layer was flat. The largest thickness of the solid electrolyte layer at each protrusion was 25 μm. The thickness of the solid electrolyte layer at the rest of the solid electrolyte layer excluding the protrusions, particular the thickness on the front end side of the anode, was 5 μm. The thickness of the element just below the mask layer, i.e., the thickness at a position including the thickest portions of the protrusions, was 170 μm. The thickness of the element at the lower end portion, i.e., the thickness on the front end side of the anode, was 130 μm.

Further, the element was immersed in a carbon paste to a position not overlapping the thickest portion of the solid electrolyte layer just below the mask layer, i.e., to a position not overlapping the thickest portions of the protrusions, and pulled up. Then, drying was performed in the same direction as that in the immersion to form a carbon layer. Thereafter, the element was immersed in a silver paste as in the formation of the carbon layer to form a silver layer as a negative conductor layer, whereby a conductive layer was formed. Thus, a solid electrolytic capacitor element was obtained. The thickness of the solid electrolytic capacitor element just below the mask layer (thickness at a position including the thickest portions of the protrusions in the solid electrolyte layer) was 170 μm. The thickness of the solid electrolytic capacitor element at the lower end portion (thickness on the front end side of the anode) was 160 μm.

Four pieces of the solid electrolytic capacitor element were stacked using a conductive adhesive to obtain a stack. Subsequently, the stack was sealed with an epoxy resin and then singulated using a dicer. A silver paste containing a resin component was screen printed on the cathode side end face and the anode side end face of the singulated exterior body (sealed body) to form external electrodes on the cathode and the anode. Thus, a finished product of a solid electrolytic capacitor was obtained. The thickness of the finished product of the solid electrolytic capacitor in the height direction was 1110 μm.

Comparative Example 1

A finished solid electrolytic capacitor was obtained as in Example 1-1, except that the drying for forming the solid electrolyte layer was performed without inverting upside down. The thickness of the solid electrolytic capacitor element just below the mask layer was 125 μm. The thickness of the solid electrolytic capacitor element at the lower end portion (thickness on the front end side of the anode) was 200 μm. The thickness of the solid electrolytic capacitor element at the lower end portion excluding the conductive layer (carbon layer and silver layer) was 170 μm. The thickness of the finished solid electrolytic capacitor in the height direction was 1230 μm.

Example 1-2

A finished solid electrolytic capacitor was obtained as in Example 1-1, except that the formed conductive layer (carbon layer and silver layer) overlapped the thickest portion of the solid electrolyte layer just below the mask layer. The thickness of the solid electrolytic capacitor element just below the mask layer (thickness at a position including the thickest portions of the protrusions in the solid electrolyte layer) was 190 μm. The thickness of the solid electrolytic capacitor element excluding the conductive layer (carbon layer and silver layer) just below the mask layer was 170 μm. The thickness of the solid electrolytic capacitor element at the lower end portion (thickness on the front end side of the anode) was 160 μm. The thickness of the solid electrolytic capacitor element at the lower end portion excluding the conductive layer (carbon layer and silver layer) was 130 μm. The thickness of the finished solid electrolytic capacitor in the height direction was 1190 μm.

In Examples 1-1 and 1-2 and Comparative Example 1, the thickness of the finished product refers to the sum of the total thickness of the four elements, the thickness of the conductive adhesive of 30 μm, the thickness of the epoxy resin of 400 μm, and the thickness of the external electrode of 20 μm.

The solid electrolytic capacitors obtained in Examples 1-1 and 1-2 and Comparative Example 1 were evaluated for the thicknesses of the finished products in the height direction, withstand voltage, and short circuit after a reflow test. The results are shown in Table 1 below.

TABLE 1

| | Thickness of finished product | Withstand voltage | Occurrence of short circuit after reflow test |
|---|---|---|---|
| Example 1-1 | 1110 μm | 40 V | 0/100 pieces |

TABLE 1-continued

| | Thickness of finished product | Withstand voltage | Occurrence of short circuit after reflow test |
|---|---|---|---|
| Comparative Example 1 | 1230 μm | 35 V | 3/100 pieces |
| Example 1-2 | 1190 μm | 40 V | 0/100 pieces |

In Examples 1-1 and 1-2, the solid electrolyte layer had a large thickness just below the mask layer. Therefore, the withstand voltage and the reflow resistance were higher than those in Comparative Example 1. Additionally, in Example 1-1, the thickest portions of the solid electrolyte layer were not covered with the conductive layer (carbon layer and silver layer) and therefore the thickness of the finished product can be reduced as compared to that in Example 1-2.

Example 2-1

Aluminum foil with an etched layer on its surface was prepared as an anode (valve-acting metal substrate). The aluminum foil was anodized by immersing it in an aqueous ammonium adipate solution to form a dielectric layer on its surface.

Subsequently, a mask layer was formed on both of the main faces and both of the side faces of the anode.

The obtained element was immersed in a solution mixture of iron (III) paratoluenesulfonate, 3,4-ethylenedioxythiophene, and 1-butanol to just below the mask layer and pulled up. Thereafter, drying was performed while the element was inverted upside down from the state in the immersion to form a solid electrolyte layer on the dielectric layer. As shown in FIG. 7, the solid electrolyte layer had, on each of the main face sides of the anode, a peripheral portion including a protrusion along the mask layer and a central portion that was surrounded by the peripheral portion and thinner than the peripheral portion. The largest thickness of the solid electrolyte layer at the protrusion in each peripheral portion was 20 μm. The thickness of the solid electrolyte layer at the peripheral portion on the front end side of the anode was 10 μm. The thickness of the solid electrolyte layer at the central portion was 5 μm. The thickness of the element just below the mask layer, i.e., the thickness at a position including the thickest portions of the protrusions, was 160 μm. The thickness of the element at the lower end portion, i.e., the thickness on the front end side of the anode, was 140 μm. The thickness of the element at the central portion was 130 μm.

Further, the element was immersed in a carbon paste to a position not overlapping the thickest portion of the solid electrolyte layer just below the mask layer, i.e., to a position not overlapping the thickest portions of the protrusions, and pulled up. Then, drying was performed in the same direction as that in the immersion to form a carbon layer. Thereafter, the element was immersed in a silver paste as in the formation of the carbon layer to form a silver layer as a negative conductor layer, whereby a conductive layer was formed. Thus, a solid electrolytic capacitor element was obtained. The thickness of the solid electrolytic capacitor element just below the mask layer (thickness at a position including the thickest portions of the protrusions in the solid electrolyte layer) was 160 μm. The thickness of the solid electrolytic capacitor element at the lower end portion (thickness on the front end side of the anode) was 160 μm.

The thickness of the solid electrolytic capacitor element at the central portion was 150 μm.

Four pieces of the solid electrolytic capacitor element were stacked using a conductive adhesive to obtain a stack. Subsequently, the stack was sealed with an epoxy resin and then singulated using a dicer. A silver paste containing a resin component was screen printed on the cathode side end face and the anode side end face of the singulated exterior body (sealed body) to form external electrodes on the cathode and the anode. Thus, a finished solid electrolytic capacitor was obtained. The thickness of the finished solid electrolytic capacitor in the height direction was 1070 μm.

Comparative Example 2

A finished solid electrolytic capacitor was obtained as in Example 2-1, except that the drying for forming the solid electrolyte layer was performed without inverting upside down. The thickness of the solid electrolytic capacitor element just below the mask layer was 125 μm. The thickness of the solid electrolytic capacitor element at the lower end portion (thickness on the front end side of the anode) was 190 μm. The thickness of the solid electrolytic capacitor element at the lower end portion excluding the conductive layer (carbon layer and silver layer) was 160 μm. The thickness of the finished solid electrolytic capacitor in the height direction was 1190 μm.

Example 2-2

A finished solid electrolytic capacitor was obtained as in Example 2-1, except that the formed conductive layer (carbon layer and silver layer) overlapped the thickest portion of the solid electrolyte layer just below the mask layer. The thickness of the solid electrolytic capacitor element just below the mask layer (thickness at a position including the thickest portions of the protrusions in the solid electrolyte layer) was 180 μm. The thickness of the solid electrolytic capacitor element excluding the conductive layer (carbon layer and silver layer) just below the mask layer was 160 μm. The thickness of the solid electrolytic capacitor element at the lower end portion (thickness on the front end side of the anode) was 160 μm. The thickness of the solid electrolytic capacitor element at the lower end portion excluding the conductive layer (carbon layer and silver layer) was 140 μm. The thickness of the solid electrolytic capacitor element at the central portion was 150 μm. The thickness of the solid electrolytic capacitor element at the central portion excluding the conductive layer (carbon layer and silver layer) was 130 μm. The thickness of the finished solid electrolytic capacitor in the height direction was 1150 μm.

In Examples 2-1 and 2-2 and Comparative Example 2, the thickness of the finished product refers to the sum of the total thickness of the four elements, the thickness of the conductive adhesive of 30 μm, the thickness of the epoxy resin of 400 μm, and the thickness of the external electrode of 20 μm.

The solid electrolytic capacitors obtained in Examples 2-1 and 2-2 and Comparative Example 2 were evaluated for the thicknesses of the finished products in the height direction, withstand voltage, and short circuit after a reflow test. The results are shown in Table 2 below.

TABLE 2

| | Thickness of finished product | Withstand voltage | Occurrence of short circuit after reflow test |
|---|---|---|---|
| Example 2-1 | 1070 μm | 8 V | 0/100 pieces |

TABLE 2-continued

| | Thickness of finished product | Withstand voltage | Occurrence of short circuit after reflow test |
|---|---|---|---|
| Comparative Example 2 | 1190 μm | 6 V | 5/100 pieces |
| Example 2-2 | 1150 μm | 8 V | 0/100 pieces |

In Examples 2-1 and 2-2, the solid electrolyte layer had a large thickness below the mask layer. Therefore, the withstand voltage and the reflow resistance were higher than those in Comparative Example 2. Additionally, in Example 2-1, the thickest portions of the solid electrolyte layer were not covered with the conductive layer (carbon layer and silver layer) and therefore the thickness of the finished product can be further reduced as compared to that in Example 2-2.

REFERENCE SIGNS LIST

1, 2, 3 solid electrolytic capacitor element
10 anode
10a front end face
10b base end face
10c, 10d main face
10e, 10f side face
11, 11A valve acting metal substrate
12 element portion
13 support portion
20 dielectric layer
30 mask layer
40 cathode
50 solid electrolyte layer
51a, 51b, 51 protrusion
52a, 52b, 52 rest of the solid electrolyte layer
53a, 53b, 53 thickest portion
54 base end
55a, 55b, 55 peripheral portion
56a, 56b, 56 central portion
57a, 57b U-shaped portion
60 conductive layer
61a, 61b protrusion
62a, 62b rest of the solid electrolyte layer
70 treatment liquid
75 treatment tank
100, 200, 300 solid electrolytic capacitor
110 exterior body
110a first main face
110b second main face
110c first side face
110d second side face
110e first end face
110f second end face
120 first external electrode
130 second external electrode
140 conductive adhesive
t1, t2 largest thickness of protrusion of solid electrolyte layer
Tmax thickness of solid electrolytic capacitor element at a position including thickest portions

The invention claimed is:

1. A solid electrolytic capacitor element comprising:
an anode comprising a valve acting metal substrate and having a front end face and a base end face;

a dielectric layer on at least a first main face of the anode but excluding at least the base end face;

a mask layer comprising an insulating material on the dielectric layer adjacent the base end face; and a cathode on the dielectric layer at a position closer to the front end face as compared to the mask layer, the cathode comprising:

a solid electrolyte layer on the dielectric layer; and a conductive layer on the solid electrolyte layer, wherein the solid electrolyte layer includes a protrusion adjacent the mask layer, and a largest thickness of the solid electrolyte layer at the protrusion is larger than a thickness of the solid electrolyte layer at the rest of the solid electrolyte layer excluding the protrusion, wherein the conductive layer does not cover the solid electrolyte layer in a region from a thickest portion of the protrusion to a base end of the solid electrolyte layer, which is on the base end face side of the anode.

2. The solid electrolytic capacitor element according to claim 1, wherein the thickness of the solid electrolytic capacitor element at the rest of the solid electrolyte layer is not larger than the thickness of the solid electrolytic capacitor element at the thickest portion of the protrusion.

3. The solid electrolytic capacitor element according to claim 1, wherein the base end of the solid electrolyte layer is on an outer main face of the mask layer.

4. The solid electrolytic capacitor element according to claim 3, wherein the solid electrolyte layer does not cover the entire outer main face of the mask layer.

5. The solid electrolytic capacitor element according to claim 1, wherein a difference between the largest thickness of the solid electrolyte layer at the protrusion and the thickness of the solid electrolyte layer at the rest of the solid electrolyte layer is 2 μm to 50 μm.

6. The solid electrolytic capacitor element according to claim 1, wherein the rest of the solid electrolyte layer is flat.

7. The solid electrolytic capacitor element according to claim 1, wherein the solid electrolyte layer includes a peripheral portion connected to the protrusion and a center portion surrounded by the peripheral portion and the protrusion, and the peripheral portion of the solid electrolyte layer is thicker than the central portion of the solid electrolyte layer.

8. The solid electrolytic capacitor element according to claim 1, wherein the protrusion is a first protrusion, the conductive layer includes a second protrusion adjacent the front end face of the anode, and a largest thickness of the conductive layer at the second protrusion is larger than a thickness of the conductive layer at a rest of the conductive layer excluding the second protrusion.

9. A solid electrolytic capacitor, comprising a stack of a plurality of the solid electrolytic capacitor elements according to claim 1.

10. A method of producing a solid electrolytic capacitor element, the method comprising:

forming a dielectric layer on at least a first main face of an anode comprising a valve acting metal substrate and having a front end face and a base end face;

forming a mask layer comprising an insulating material on the dielectric layer adjacent the base end face;

immersing the anode with the mask layer on the dielectric layer from the front end face side in a solid electrolyte-containing treatment liquid until the treatment liquid contacts the mask layer; and pulling up the anode from the treatment liquid and drying the treatment liquid, wherein the drying is performed while the anode is inverted upside down from a state in the immersion so as to form a protrusion in the solid electrolyte layer adjacent the mask layer such that a largest thickness of the solid electrolyte layer at the protrusion is larger than a thickness of the solid electrolyte layer at a rest of the solid electrolyte layer excluding the protrusion.

11. The method of producing the solid electrolytic capacitor element according to claim 10, wherein the immersing and the pulling up and drying are alternately performed in this order multiple times, and the drying is performed while the anode is inverted upside down from the state in the immersion in at least one of the multiple times of the pulling up and drying.

12. The method of producing the solid electrolytic capacitor element according to claim 10, further comprising immersing the anode from the front end face in a conductive paste until the conductive paste contacts the protrusion, and drying the conductive paste to form a conductive layer on the solid electrolyte layer.

13. The method of producing the solid electrolytic capacitor element according to claim 12, wherein the conductive layer does not cover the solid electrolyte layer in a region from a thickest portion of the protrusion to a base end of the solid electrolyte layer, which is on the base end face side of the anode.

14. The method of producing the solid electrolytic capacitor element according to claim 13, wherein the thickness of the solid electrolytic capacitor element at the rest of the solid electrolyte layer is not larger than the thickness of the solid electrolytic capacitor element at the thickest portion of the protrusion.

15. The method of producing the solid electrolytic capacitor element according to claim 13, wherein the base end of the solid electrolyte layer is on an outer main face of the mask layer.

16. The method of producing the solid electrolytic capacitor element according to claim 15, wherein the solid electrolyte layer does not cover the entire outer main face of the mask layer.

17. The method of producing the solid electrolytic capacitor element according to claim 10, wherein a difference between the largest thickness of the solid electrolyte layer at the protrusion and the thickness of the solid electrolyte layer at the rest of the solid electrolyte layer is 2 μm to 50 μm.

18. The method of producing the solid electrolytic capacitor element according to claim 10, wherein the rest of the solid electrolyte layer is flat.

* * * * *